(12) United States Patent
Funaya

(10) Patent No.: US 8,035,954 B2
(45) Date of Patent: Oct. 11, 2011

(54) SURFACE-MOUNT TYPE ELECTROLYTIC CAPACITOR AND METHOD OF PRODUCING THE SAME

(75) Inventor: Osamu Funaya, Sendai (JP)

(73) Assignee: NEC Tokin Corporation, Sendai-Shi (JP)

( * ) Notice: Subject to any disclaimer, the term of this patent is extended or adjusted under 35 U.S.C. 154(b) by 250 days.

(21) Appl. No.: 11/998,285

(22) Filed: Nov. 29, 2007

(65) Prior Publication Data
US 2008/0123253 A1   May 29, 2008

(30) Foreign Application Priority Data

Nov. 29, 2006  (JP) ................. 2006-321853
Aug. 9, 2007   (JP) ................. 2007-208070

(51) Int. Cl.
*H01G 9/10*   (2006.01)
*H01G 2/10*   (2006.01)
*H01G 9/08*   (2006.01)
*B65D 51/00*  (2006.01)
*H05K 5/03*   (2006.01)

(52) U.S. Cl. .................... 361/537; 361/535

(58) Field of Classification Search .......... 361/517, 361/518, 519, 535, 536, 537
See application file for complete search history.

(56) References Cited

U.S. PATENT DOCUMENTS

| | | | | |
|---|---|---|---|---|
| 4,769,745 A | * | 9/1988 | Viernickel et al. | 361/518 |
| 5,041,696 A | * | 8/1991 | Utner | 174/562 |
| 5,148,347 A | * | 9/1992 | Cox et al. | 361/272 |
| 5,963,419 A | * | 10/1999 | Tanaka et al. | 361/512 |
| 6,141,205 A | * | 10/2000 | Nutzman et al. | 361/509 |
| 6,310,762 B1 | * | 10/2001 | Okamura et al. | 361/502 |
| 7,227,737 B2 | * | 6/2007 | Mitchell et al. | 361/502 |
| 7,576,972 B2 | * | 8/2009 | Savary et al. | 361/519 |
| 2005/0185362 A1 | * | 8/2005 | Arai et al. | 361/535 |
| 2006/0087795 A1 | * | 4/2006 | Nagasawa et al. | 361/306.3 |
| 2006/0238958 A1 | * | 10/2006 | Nakamura et al. | 361/502 |

FOREIGN PATENT DOCUMENTS

| | | | |
|---|---|---|---|
| JP | 02007507 A | * | 1/1990 |
| JP | 2006-128247 A | | 5/2006 |

* cited by examiner

*Primary Examiner* — Eric Thomas
*Assistant Examiner* — David M Sinclair
(74) *Attorney, Agent, or Firm* — Holtz, Holtz, Goodman & Chick, PC

(57) ABSTRACT

An exterior case for a surface-mount type electrolytic capacitor has a box type resin case and an exterior case cover. The resin case incorporates anode terminals and a cathode terminal at the bottom portion and is open upward. The exterior cover covers the top and an outer surface of a side wall of the resin case. A convex portion is formed on an inner surface of a ceiling of the exterior case cover and, thereby, a concave portion is formed between an inner surface of the side wall of the exterior case cover and the convex portion. The concave portion and an upper end portion of the side wall of the resin case are fitted together with an adhesive therebetween. An upper surface of the capacitor element is pressed by the convex portion of the inner surface of the ceiling of the exterior case cover and, thereby, a positional deviation thereof is prevented.

6 Claims, 4 Drawing Sheets

SURFACE-MOUNT TYPE ELECTROLYTIC CAPACITOR AND METHOD OF PRODUCING THE SAME

This application is based upon and claims the benefit of priority from Japanese patent application No. 2006-321853, filed on Nov. 29, 2006, and Japanese patent application No. 2007-208070, filed on Aug. 9, 2007, the disclosures of which are incorporated herein in their entirety by reference.

BACKGROUND OF THE INVENTION

The present invention relates to a surface-mount type electrolytic capacitor and a method of producing the same. In particular, the present invention relates to a surface-mount type electrolytic capacitor exhibiting improved reliability and a method of producing the same.

A conventional surface-mount type electrolytic capacitor is disclosed in, for example, Japanese Unexamined Patent Application Publication (JP-A) No. 2006-128247 (hereafter referred to as Patent Document 1). The surface-mount type electrolytic capacitor disclosed in Patent Document 1 is called a three-terminal transmission-line element. As disclosed in Patent Document 1, the surface-mount type electrolytic capacitor uses an electrically conductive functional polymer film as a solid electrolyte. The surface-mount type electrolytic capacitor comprises a plurality of capacitor elements. In order to produce each capacitor element, an anodized coating layer is at first formed on a surface of a valve-action metal, so that a valve-action metal anode is prepared. Then, the electrically conductive functional polymer film is formed so as to cover the center portion of the anodized coating layer surface of the anode. A graphite layer is formed around the electrically conductive functional polymer film. Furthermore, a silver paste layer is formed as a cathode layer. After the above-mentioned layers are formed in this order, an anode lead portion at an end portion of the capacitor element is connected, by the use of an electrically conductive adhesive, through an electrically conductive spacer to an anode terminal formed in a resin case. A cathode portion at a center portion of the capacitor element is connected, by the use of an electrically conductive adhesive, directly to a cathode terminal formed in the resin case. Thereafter, an exterior case cover is fixed with an adhesive.

In the conventional surface-mount type electrolytic capacitor, the capacitor element is placed in the resin case, and is connected and fixed to the anode and cathode terminals. Thereafter, the exterior case cover is fixed to the resin case, and sealing is performed. In each of the fixing operations, an electrically conductive adhesive or an adhesive is used and subjected to drying and curing. Therefore, a fixing jig and a drying furnace are required for each of the fixing operations. An apparatus and a lead time in the production process are required for each of the drying and the curing steps. Furthermore, in joining the resin case and the exterior case cover, nonuniformity or variation may occur in distribution of the adhesive, resulting in nonuniformity or variation in adhesion or residual strain. As a consequence, characteristics tend to vary and uniform quality is not obtained.

SUMMARY OF THE INVENTION

Accordingly, it is an object of the present invention to provide a surface-mount type electrolytic capacitor, which is capable of achieving reduction of a lead time and simplification of an apparatus and which is prevented from variation in characteristics because of an improved hermeticity.

It is another object of the present invention to provide a method of producing the above-mentioned surface-mount type electrolytic capacitor.

According to one aspect to the present invention, there is provided a surface-mount type electrolytic capacitor which includes a capacitor main body having anode lead portions at end portions and a cathode portion at a center portion, anode terminals connected to the anode lead portions, a cathode terminal connected to the cathode portion, and an exterior case for armoring the capacitor main body, the anode terminals, and the cathode terminal. In the electrolytic capacitor, the exterior case includes a box type resin case and an exterior case cover. The resin case incorporates the anode terminals and the cathode terminal at the bottom portion and is open upward. The exterior case cover covers the top and at least a part of an outer surface of a side wall of the resin case. The exterior case cover has a convex portion disposed on an inner surface of a ceiling and a concave portion which is disposed between an inner surface of the side wall of the exterior case cover and the convex portion and into which an upper end portion of the side wall of the resin case is fitted.

According to another aspect of the present invention, there is provided an exterior case cover of an exterior case which is used to cover a capacitor main body of a surface-mount type electrolytic capacitor. The exterior case cover comprises a convex portion disposed on an inner surface of a ceiling and a concave portion disposed between an inner surface of the side wall of the exterior case cover and the convex portion.

According to still another aspect of the present invention, there is provided a method of producing a surface-mount type electrolytic capacitor. In the aspect of the present invention, the method includes the steps of producing a tabular capacitor element having anode lead portions at end portions and a cathode portion at a center portion; connecting electrically conductive spacers to the anode lead portions of the capacitor element; placing the capacitor element on anode terminals and a cathode terminal of a box type resin case with an electrically conductive adhesive therebetween, while the resin case includes the anode terminals at both bottom end portions and the cathode terminal at a bottom center portion and is open upward, applying an adhesive to the upper end surface of the resin case, and fitting the exterior case cover to the resin case while the exterior case cover has a convex portion on the inner side of the upper surface and the capacitor element is pressed by the convex portion; and curing the electrically conductive adhesive and the adhesive at the same time.

According to yet another aspect of the present invention, there is provided a method of producing a surface-mount type electrolytic capacitor. In the aspect of the present invention, the method includes the steps of producing tabular capacitor elements having anode lead portions at end portions and a cathode portion at a center portion; connecting electrically conductive spacers to the anode lead portions of the capacitor element and laminating the capacitor elements so as to form a capacitor element laminate; placing the capacitor element laminate on anode terminals and a cathode terminal of a box type resin case with an electrically conductive adhesive therebetween, while the resin case includes the anode terminals at both bottom end portions and the cathode terminal at a bottom center portion and is open upward; applying an adhesive to the upper end surface of the resin case, and fitting the exterior case cover to the resin case while the exterior case cover has a convex portion on the inner side of the upper surface and the capacitor element is pressed by the convex portion; and curing the electrically conductive adhesive and the adhesive at the same time.

DESCRIPTION OF THE PREFERRED EMBODIMENTS

Before explanation of specific examples of the present invention, a conventional electrolytic capacitor will be described with reference to FIGS. 1A to 1C in order to facilitate the understanding of the present invention.

Figure 1A:
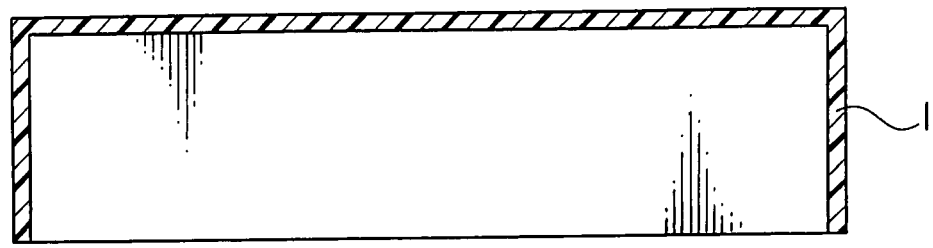
FIG. 1A is a sectional elevation view of an exterior case cover of a conventional surface-mount type electrolytic capacitor.
Figure 1B:
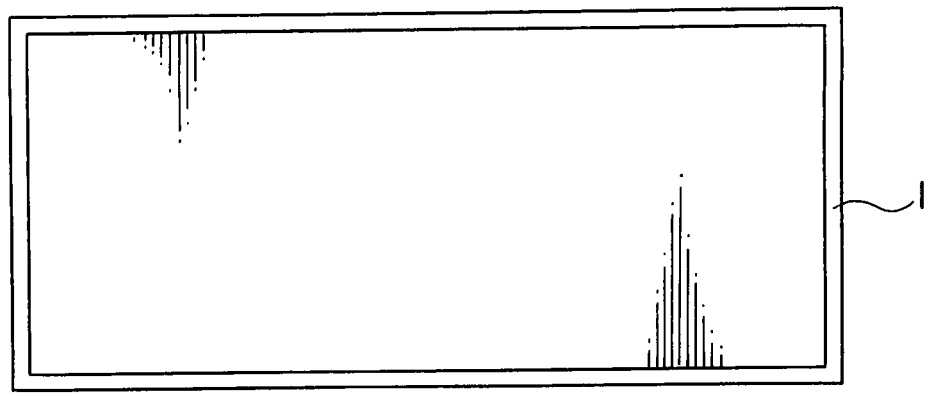
FIG. 1B is a bottom view of the exterior case cover shown in FIG. 1A.
Figure 1C:
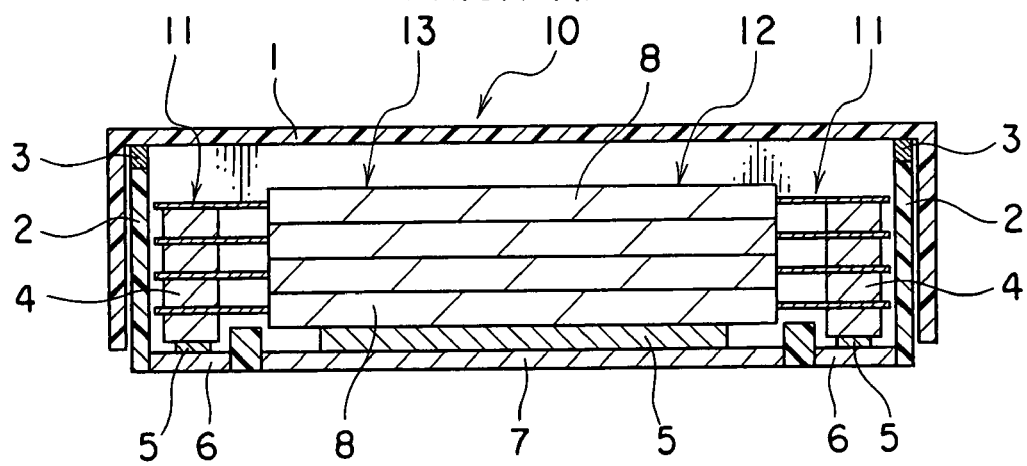
FIG. 1C is a sectional elevation view of the conventional surface-mount type electrolytic capacitor.

The conventional capacitor shown in FIGS. 1A, 1B, and 1C is called a three-terminal transmission-line element. Referring to FIGS. 1A, 1B, and 1C, the conventional surface-mount type electrolytic capacitor 10 disclosed in Patent Document 1 uses an electrically conductive functional polymer film as a solid electrolyte. The surface-mount type electrolytic capacitor comprises a plurality of capacitor elements 8. In order to produce each capacitor element 8, an anodized coating layer is at first formed on a surface of a valve-action metal, so that a valve-action metal anode is prepared. Then, the electrically conductive functional polymer film is formed so as to cover the center portion of the anodized coating layer surface of the anode. A graphite layer is formed around the electrically conductive polymer. Furthermore, a silver paste layer is formed as a cathode layer. After the above-mentioned layers are formed in this order, anode lead portions 11 at end portions of the capacitor element 8 are connected, by the use of an electrically conductive adhesive 5, through electrically conductive spacers 4 to anode terminals 6 disposed in a resin case 2. On the other hand, a cathode portion 12 at a center portion of the capacitor element 8 is connected, by the use of an electrically conductive adhesive 5, directly to a cathode terminal 7 disposed in the resin case 2. Herein, a capacitor element laminate 13 is formed by laminating a plurality of capacitor elements 8 and may be referred to as a capacitor main body 13. Thereafter, an exterior case cover 1 is fixed by the use of an adhesive 3.

Next, a surface-mount type electrolytic capacitor according to one aspect of the present invention will be described below in detail.

The surface-mount type electrolytic capacitor includes a capacitor main body, anode terminals, a cathode terminal, and an exterior case for armoring the capacitor main body, the anode terminals, and the cathode terminal.

The capacitor main body is composed of a tabular capacitor element having anode lead portions at armored end portions and a cathode portion at a center portion. Alternatively, the capacitor main body may be composed of a capacitor element laminate produced by laminating the above-described capacitor elements.

The anode terminals are connected to the above-described anode lead portions. The cathode terminal is connected to the above-described cathode portion.

The exterior case has a box type resin case and an exterior case cover. The resin case incorporates the above-described anode terminals and the cathode terminal at the bottom portion and is open upward. The exterior case cover covers the top and at least a part of an outer surface of a side wall of the resin case.

An exterior case cover according to an aspect of the present invention includes a convex portion disposed on an inner surface of a ceiling. Because of presence of the convex portion, a concave portion is formed between an inner surface of the side wall of the exterior case cover and the above-described convex portion. This concave portion is fitted to an upper end portion of the side wall of the above-described resin case.

The above-described capacitor main body is pressed by a lower surface of the convex portion formed on the inner surface of the ceiling of the above-described exterior case cover.

The above-described resin case and the above-described exterior case cover are fitted together and are joined by the use of an adhesive. The above-described anode lead portion and the anode terminal are joined together and the above-described cathode portion and the cathode terminal are joined together, by the use of an electrically conductive adhesive.

The convex portion of the above-described exterior case cover may be formed from the same material as that for the above-described exterior case cover and be formed integrally with the exterior case cover. Alternatively, the convex portion of the exterior case cover may be formed from an elastic member and be connected to the above-described exterior case cover.

Next, description will be made of a method of producing the surface-mount type electrolytic capacitor having the above-mentioned structure, according to an aspect of the present invention.

In case where a capacitor main body has a single tabular capacitor element, the method includes the steps of producing a tabular capacitor element having anode lead portions at end portions and a cathode portion at a center portion, connecting electrically conductive spacers to the anode lead portions of the above-described capacitor element, placing the above-described capacitor element on anode terminals and a cathode terminal of a box type resin case with an electrically conductive adhesive therebetween, while the resin case includes the above-described anode terminals at both bottom end portions and the cathode terminal at a bottom center portion and is open upward, applying an adhesive to the upper end surface of the above-described resin case, and fitting the above-described exterior case cover to the above-described resin case while the exterior case cover has a convex portion inside the upper surface and the anode lead portions and the cathode portion of the above-described capacitor element are pressed by the convex portion, and curing the above-described electrically conductive adhesive and the above-described adhesive at the same time.

Furthermore, in case where a capacitor main body is composed of a plurality of tabular capacitor elements as a capacitor element laminate, the method includes the steps of producing tabular capacitor elements having anode lead portions at end portions and a cathode portion at a center portion, connecting electrically conductive spacers to the anode lead portions of the above-described capacitor elements and laminating the above-described capacitor elements so as to form a capacitor element laminate, placing the capacitor element laminate on anode terminals and a cathode terminal of a box type resin case with an electrically conductive adhesive therebetween, while the resin case includes the above-described anode terminals at both bottom end portions and the above-described cathode terminal at a bottom center portion and is open upward, applying an adhesive to the upper end surface of the above-described resin case, and fitting the above-described exterior case cover to the above-described resin case while the exterior case cover has a convex portion inside the upper surface and the anode lead portions and the cathode portion of the above-described capacitor element laminate are pressed by the above-described convex portion, and curing the above-described electrically conductive adhesive and the above-described adhesive at the same time.

In the above-mentioned surface-mount type electrolytic capacitor according to the present invention, the resin case and the exterior case cover are fitted together and are joined with the adhesive. Therefore, the adhesion of the exterior case increases, and the reliability can be improved because of an improved hermeticity.

In case where the anode lead portions and the cathode portion of the capacitor element are pressed by the convex portion of the exterior case cover and joined to the anode terminals and the cathode terminal by the use of the electrically conductive adhesive, more reliable connection can be achieved and variation in characteristics due to incomplete and insufficient connection is prevented.

In the method of producing a surface-mount type electrolytic capacitor according to the present invention, the resin case and the exterior case cover are fixed in the state where the capacitor element is pressed. Previously, a curing operation of an electrically conductive adhesive is performed in the connection between the capacitor element and the resin case and a curing operation of an adhesive is performed in the connection between the resin case and the exterior case cover. Thus, these curing operations are individually and separately carried out previously. According to the above-described method of the present invention, these operations can be performed at the same time. Therefore, the operability is improved, and the facilities can be simplified.

Now, examples according to the present invention will be described with reference to FIGS. 2A to 4C. It will readily be understood that the present invention is not limited to these examples.

Example 1

Figure 2A:
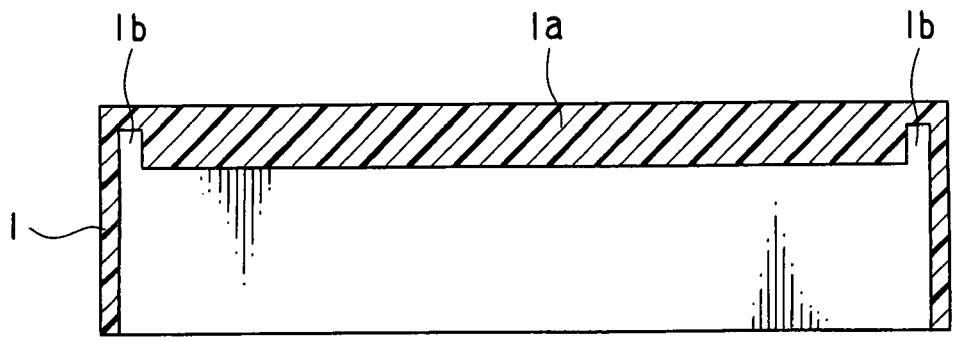
FIG. 2A is a sectional elevation view of an exterior case cover of a surface-mount type electrolytic capacitor according to Example 1 of the present invention.
Figure 2B:
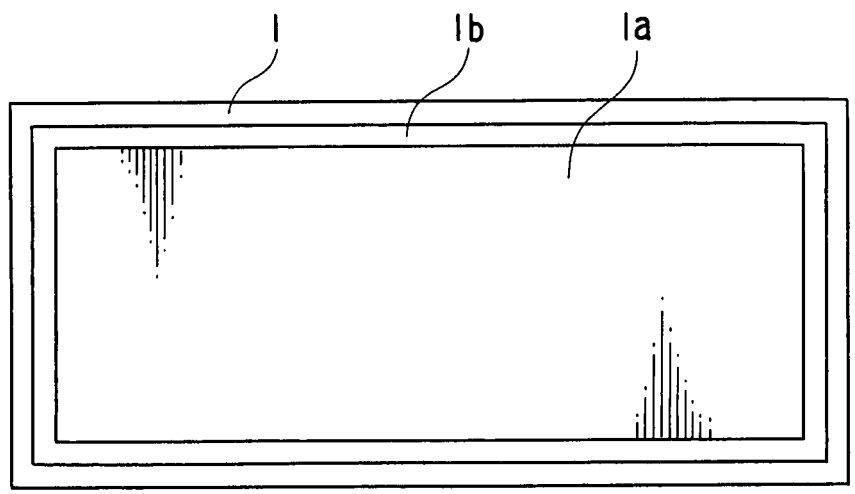
FIG. 2B is a bottom view of the exterior case cover shown in FIG. 2A.
Figure 2C:
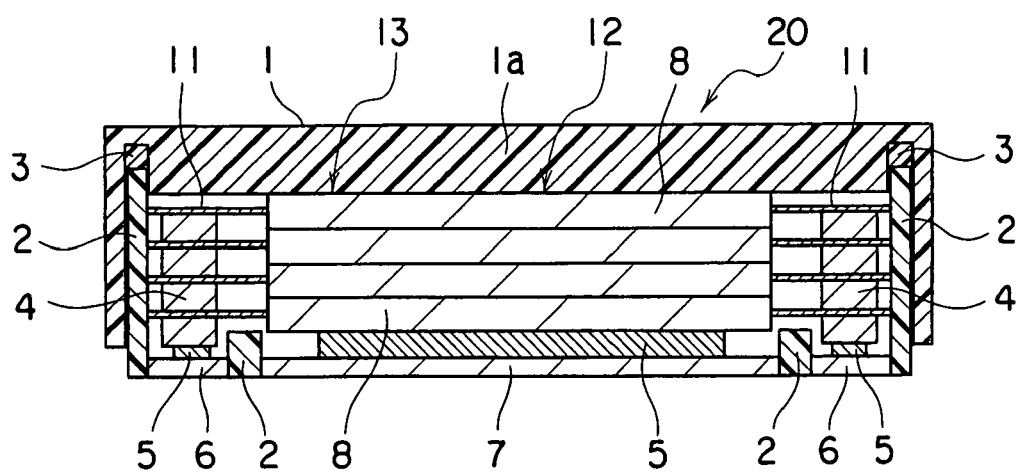
FIG. 2C is a sectional elevation view of the entire surface-mount type electrolytic capacitor according to Example 1 of the present invention.

As shown in FIGS. 2A, 2B, and 2C, a surface-mount type electrolytic capacitor 20 according to Example 1 of the present invention has the following configuration.

Electrically conductive spacers 4 are connected to anode lead portions 11 of each of a plurality of tabular capacitor elements 8. The capacitor elements 8 are laminated to form a capacitor element laminate 13 as a capacitor main body 13. A box type resin case 2 is produced as one element for constituting an exterior case. This resin case 2 has anode terminals 6 disposed at both ends of the bottom portion and a cathode terminal 7 disposed at a center of the bottom portion, and is produced by injection molding or the like integrally with the anode terminals 6 and the cathode terminal 7. In the inside of the resin case 2, an electrically conductive adhesive 5 is inserted between a cathode layer of the capacitor element 8 and the cathode terminal 7 to connect the cathode layer and the cathode terminal 7 to each other and between the spacer 4 and the anode terminal 6 to connect the spacer 4 and the anode terminal 6 to each other.

An exterior case cover 1 is prepared as the other element of the exterior case. This exterior case cover 1 is produced in the manner such that a rectangular convex portion 1a is formed on an inner surface of the ceiling and a concave portion 1b is formed around the convex portion 1a.

An adhesive 3 is applied to an upper end surface of the side wall of the resin case 2. An upper end portion of the side wall of the resin case 2 is fitted into the concave portion 1b of the exterior case cover 1. The material for the resin case 2 may be the same as or different from the material for the exterior case cover 1. The exterior case cover 1 is preferably made of an insulating material because the characteristics do not change, and more preferably, a resin material in view of the workability and the adhesion.

Thus, as shown in FIG. 2C, the resin case 2 and the exterior case cover 1 can be joined and fixed in the state where the capacitor element 8 is pressed by the convex portion 1a. According to the present invention, it is possible to simultaneously perform two curing operations, that is, (1) the curing operation of an electrically conductive adhesive 5 for connecting the capacitor element 8 with the anode terminals 6 and the cathode terminal 7 on the bottom portion of the resin case 2 and (2) the curing operation of the adhesive 3 for joining and fixing the resin case 2 and the exterior case cover 1. Previously, the two curing operations are performed separately and individually.

The upper end portion of the side wall of the resin case 2 is fitted into the concave portion 1b in the inside of the exterior case cover 1 with the adhesive 3 therebetween. Therefore, the adhesion increases, and the reliability can be improved because of an improved hermeticity.

Example 2

Figure 3A:
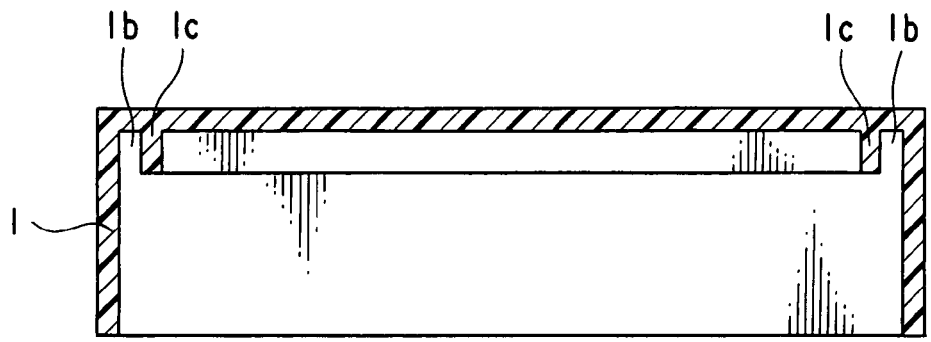
FIG. 3A is a sectional elevation view of an exterior case cover of a surface-mount type electrolytic capacitor according to Example 2 of the present invention.
Figure 3B:
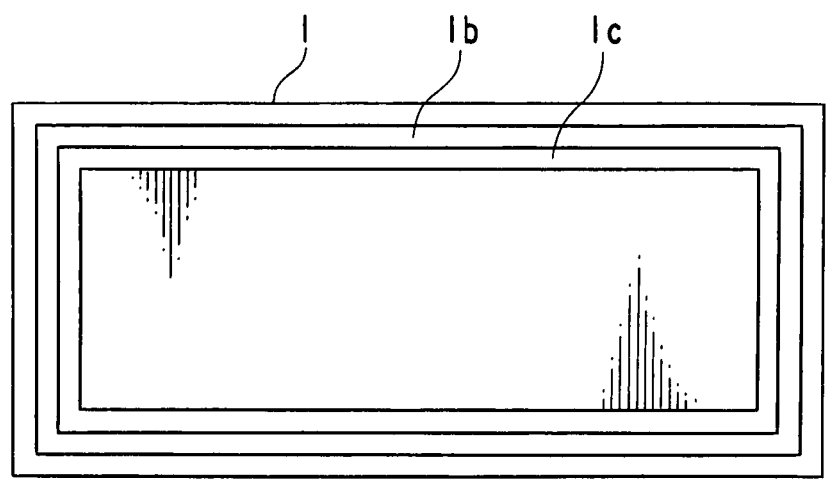
FIG. 3B is a bottom view of the exterior case cover shown in FIG. 3A.
Figure 3C:
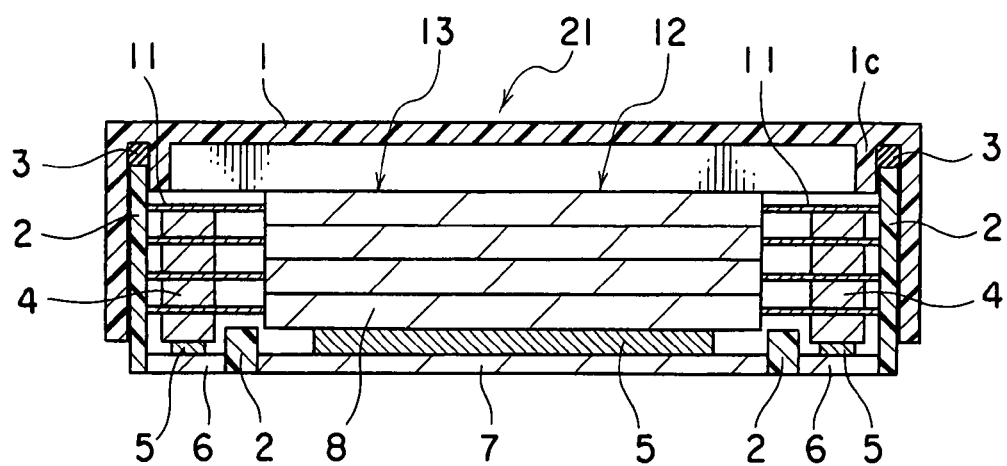
FIG. 3C is a sectional elevation view of the entire surface-mount type electrolytic capacitor according to Example 2 of the present invention.

Referring to FIGS. 3A, 3B, and 3C, a surface-mount type electrolytic capacitor 21 according to Example 2 of the present invention is similar to that in Example 1 except that the shape of an inner wall of the exterior case cover 1 is different.

That is, a convex portion to press the capacitor element 8 from above is not formed at the center portion of the inner surface of the ceiling of the exterior case cover 1 in Example 2 of the present invention. Instead, a bank-shaped convex portion 1c is formed in the manner such that the concave portion 1b is formed along the edge of the ceiling surface. An upper end portion of the side wall of the resin case 2 is fitted into the concave portion 1b with the adhesive 3 therebetween and joining and fixing are performed.

In the production of the surface-mount type electrolytic capacitor 21 according to Example 2 of the present invention, this exterior case cover 1 and the resin case 2 similar to that in Example 1 are used. A capacitor main body 13 is composed of a plurality of the capacitor elements 8 as a laminate capacitor element 13. The capacitor main body 13 is connected to the anode terminals 6 and the cathode terminal 7 on the inner side of the bottom portion of the resin case 2 by the use of the electrically conductive adhesive 5. The upper end portion of the side wall of the resin case 2 is fitted into the concave portion 1b of the exterior case cover 1 with the adhesive 3 therebetween, so that joining and fixing are performed. In this manner, the surface-mount type electrolytic capacitor 21 is produced.

According to Example 2 as well, the adhesion of the exterior case is improved without requiring strict control of the amount of application of the adhesive 3. Therefore, a surface-mount type electrolytic capacitor prevented from variation in characteristic can be produced. Furthermore, the external dimension tolerance of the product can be reduced.

Example 3

Figure 4A:
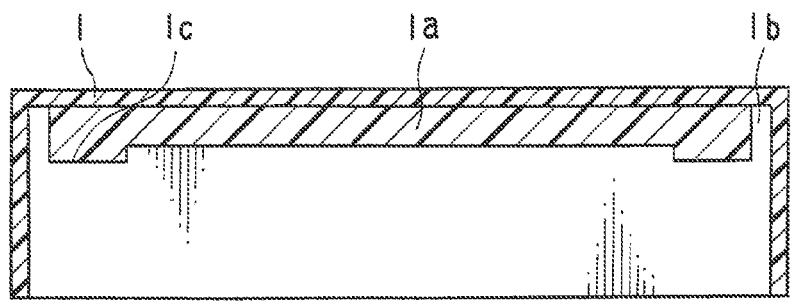
FIG. 4A is a sectional elevation view of an exterior case cover of a surface-mount type electrolytic capacitor according to Example 3 of the present invention.
Figure 4B:
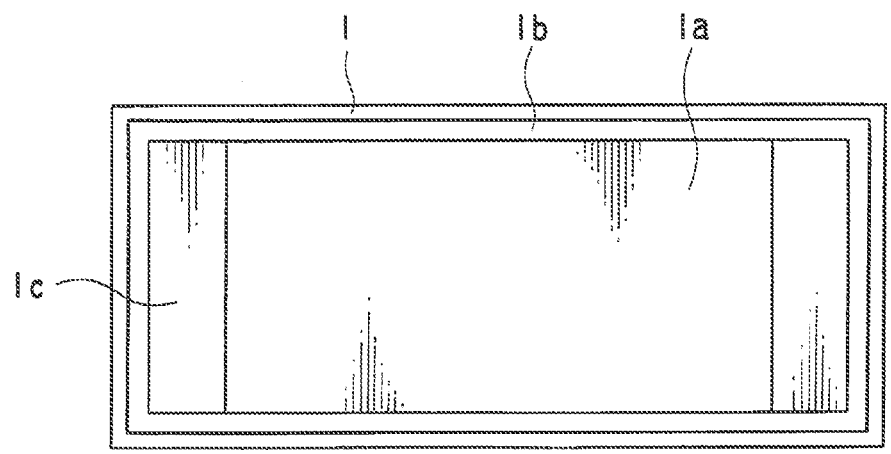
FIG. 4B is a bottom view of the exterior case cover shown in FIG. 4A.
Figure 4C:
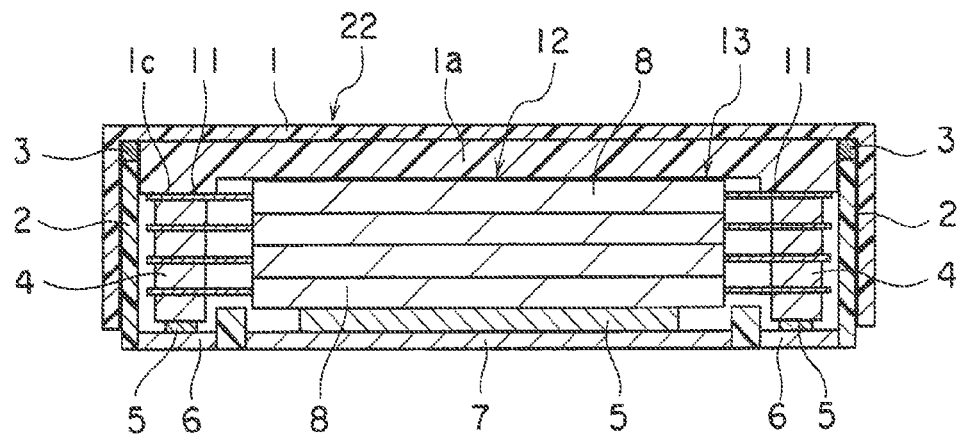
FIG. 4C is a sectional elevation view of the surface-mount type electrolytic capacitor as shown in FIG. 4A.

Referring to FIGS. 4A, 4B, and 4C, a surface-mount type electrolytic capacitor 22 according to Example 3 of the present invention is similar to the surface-mount type electrolytic capacitors in Examples 1 and 2 except that the structure of an inner wall surface of the exterior case cover 1 is different.

That is, the exterior case cover in Example 3 has convex portions 1a and 1c on the inner side of the upper surface and the concave portion 1b around them.

The surface-mount type electrolytic capacitor 22 according to Example 3 of the present invention is produced as described below.

The electrically conductive spacers 4 are connected to the anode lead portions 11 at both end portions of tabular capacitor elements 8. The required number of the resulting capacitor elements 8 are laminated so as to prepare the capacitor element laminate 13 as a capacitor main body 13. A box type resin case 2 is produced. This resin case 2 is produced so that the anode terminals 6 are disposed at both ends of the bottom portion, the cathode terminal 7 is disposed at the center of the bottom portion, and the anode terminals 6 and the cathode terminal 7 are formed integrally by injection molding or the like. The capacitor elements 8 are mounted on the resulting resin case 2. That is, the cathode portions 12 of the capacitor elements 8 are mounted on the electrically conductive adhesive 5 on the cathode terminal 7, and the anode lead portions 11 are mounted on the electrically conductive adhesive 5 on the anode terminals 6 with electrically conductive spacers 4 therebetween.

The adhesive 3 is applied to an upper end portion of the side wall portion of the resin case 2. The exterior case cover 1 has the convex portions 1a and 1c on the inner side of the upper surface and the concave portion 1b around them. The resin case 2 is fitted into the concave portion 1b of the exterior case cover 1. Upon fitting the exterior case cover 1, the convex portion 1a at the center portion of the exterior case cover 1 presses the cathode portion 12 of the capacitor element 8, and at the same time, the convex portions 1c at both end portions of the exterior case cover 1 press the anode lead portions 11 including the electrically conductive spacers 4. Thereafter, the adhesive 3 of the exterior case cover 1 and the electrically conductive adhesive 5 of the capacitor element laminate 13, i.e. capacitor main body 13, are dried at the same time. Consequently, it is possible to simplify jigs and the like used in the drying and to reduce the drying time. The convex portions of the exterior case cover can be produced integrally with the exterior case cover by molding, e.g., injection molding. Alternatively, the convex portions may be formed from an elastic member, e.g., a silicone resin or fluororubber, and be joined to the inside of an exterior case cover, while the exterior case cover is produced by molding an epoxy resin, PPS (polyphenylene sulfide) resin, or the like into the shape of a box. In case where the elastic member is used as the convex portions, production can be performed without requiring strict control of the dimensional accuracy of the height difference between the convex portion 1a at the center portion and the convex portions 1c at both end portions.

In the explanations of Examples 1, 2, and 3, the laminated capacitor element 13 comprising the capacitor elements 8 is used as the capacitor main body 13. However, in the present invention, even when a single tabular capacitor element 8 is used, a surface-mount type electrolytic capacitor can be obtained, as will readily be understood.

In Examples 1, 2, and 3 of the present invention, the anode lead portions 11 are disposed at both sides of the capacitor element 8. However, the capacitor element according to the present invention may have the cathode portion 12 on one side and the anode lead portion 11 on the other side. It will readily be understood that a plurality of cathode portions and anode lead portions may be disposed alternately in a length direction or a width direction.

The surface-mount type electrolytic capacitor according to the present invention may be applied to an electronic component of a type to be surface-mounted on a printed circuit board and to form electrodes on a bottom of the product.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A surface-mount type electrolytic capacitor comprising:
   a capacitor main body having anode lead portions at end portions and a cathode portion at a center portion;
   anode terminals connected to the anode lead portions;
   a cathode terminal connected to the cathode portion; and
   an exterior case for armoring the capacitor main body, the anode terminals, and the cathode terminal,
   wherein the exterior case includes a box type resin case and an exterior case cover,
   wherein the resin case includes the anode terminals and the cathode terminal at a bottom portion thereof and is open upward, and
   wherein the exterior case cover covers a top and at least a part of an outer surface of a side wall of the resin case, the exterior case cover having a convex portion formed on an inner surface of a ceiling and a concave portion which is disposed between an inner surface of a side wall of the exterior case cover and the convex portion,
   wherein an upper end portion of the side wall of the resin case is fitted into the concave portion between the inner surface of the side wall of the exterior case cover and the convex portion, and wherein the capacitor main body is pressed by a lower surface of the convex portion, and
   wherein the convex portion of the exterior case cover is formed from an elastic member and is connected to the exterior case cover.

2. The electrolytic capacitor according to claim 1, wherein the capacitor main body comprises one of a tabular capacitor element and a capacitor element laminate produced by laminating plural capacitor elements.

3. The electrolytic capacitor according to claim 1, wherein:
   the resin case and the exterior case cover are fitted together and joined with an adhesive, and the anode lead portions and the anode terminals, and the cathode portion and the cathode terminal are joined together with an electrically conductive adhesive.

4. An exterior case cover of an exterior case used to cover a capacitor main body of a surface-mount type electrolytic capacitor, the exterior case cover comprising:
- a convex portion formed on an inner surface of a ceiling; and
- a concave portion disposed between an inner surface of a side wall of the exterior case cover and the convex portion,
- wherein the concave portion between the inner surface of the side wall of the exterior case cover and the convex portion is adapted to be fitted with an upper end portion of a side wall of a resin case, and wherein the capacitor main body is pressed by a lower surface of the convex portion, and
- wherein the convex portion of the exterior case cover is formed from an elastic member and is connected to the exterior case cover.

5. The exterior case cover according to claim 4, wherein:
- the capacitor main body comprises anode lead portions at end portions and a cathode portion at a center portion, and
- the exterior case armors anode terminals connected to the anode lead portions, a cathode terminal connected to the cathode portion, and the capacitor main body.

6. The exterior case cover according to claim 4, wherein the exterior case cover is fitted and joined with an adhesive to the resin case.

* * * * *